No. 814,394. PATENTED MAR. 6, 1906.
H. P. PFLUM.
WASHING MACHINE.
APPLICATION FILED OCT. 11, 1904.

2 SHEETS—SHEET 2.

WITNESSES:
J. A. Brophy
F. D. Ammen

INVENTOR
Harry P. Pflum
BY
ATTORNEYS

UNITED STATES PATENT OFFICE.

HARRY P. PFLUM, OF NEW YORK, N. Y.

WASHING-MACHINE.

No. 814,394.　　　　　Specification of Letters Patent.　　　　　Patented March 6, 1906.

Application filed October 11, 1904. Serial No. 227,981.

*To all whom it may concern:*

Be it known that I, HARRY P. PFLUM, a citizen of the United States, and a resident of the city of New York, Bath Beach, borough of Brooklyn, in the county of Kings and State of New York, have invented a new and Improved Washing-Machine, of which the following is a full, clear, and exact description.

This invention relates to washing-machines, and especially to that class which may be operated by hand.

A principal object of the invention is to produce a washing-machine the construction of which especially adapts it for portability and enables the machine to be readily detached or attached in operative position. A construction has been adopted also which enables the principal part of the device to be thrown to one side, so as to facilitate the attachment of a wringer in the position normally occupied by the same.

Reference is to be had to the accompanying drawings, forming a part of this specification, in which similar characters of reference indicate corresponding parts in all the figures.

Figure 1:
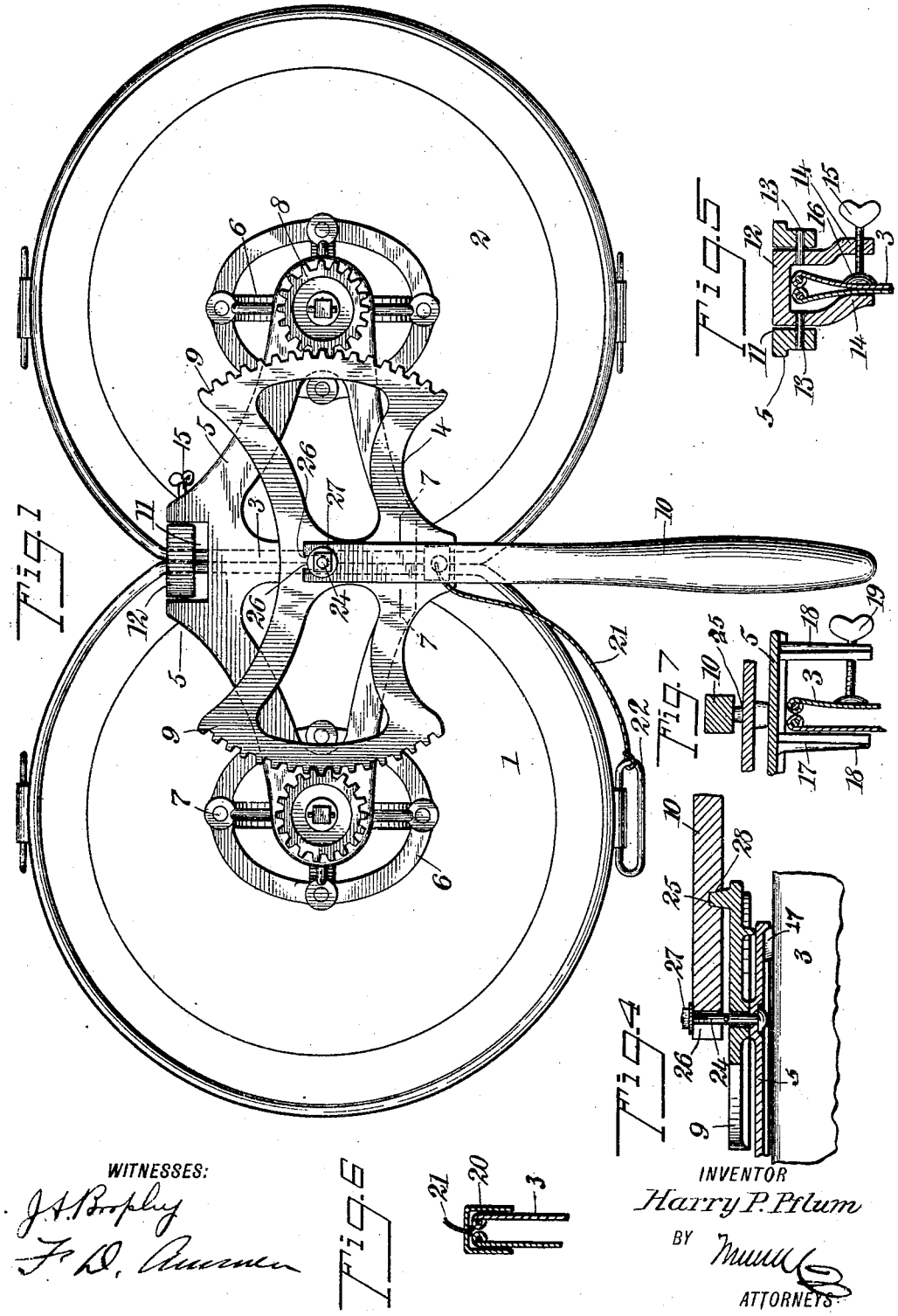
Figure 2:
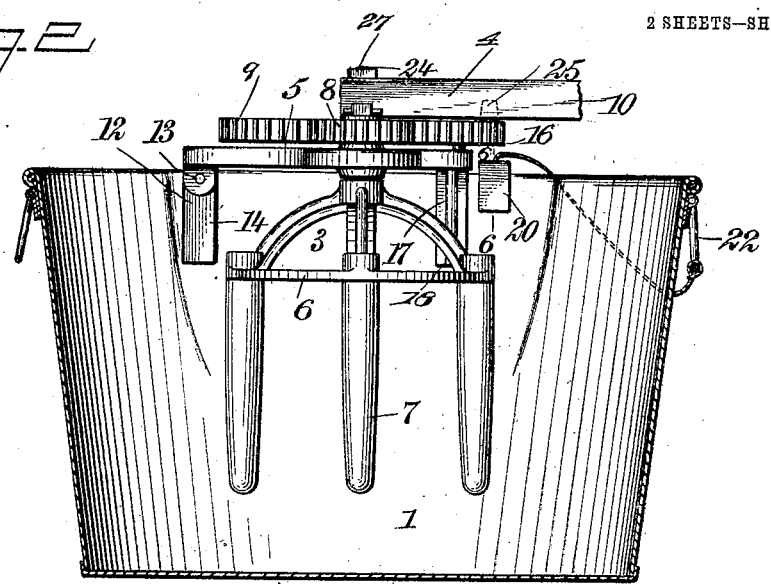
Figure 3:
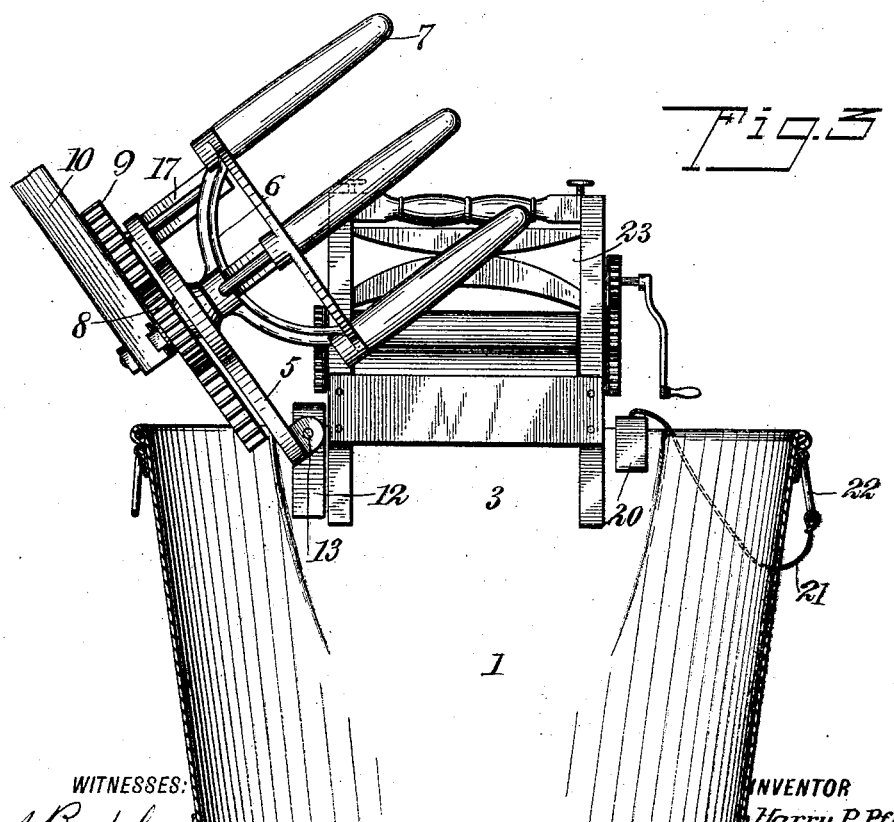

Figure 1 is a plan representing the device as including two tubs placed adjacent to each other. Fig. 2 is a vertical section taken substantially centrally through one of these tubs and representing the agitating mechanism in elevation. In this view the handle of the device is represented as broken away. Fig. 3 is a view substantially similar to Fig. 2, but representing the agitating mechanism thrown into an inoperative position and representing a wringer attached in the normal position thereof. In this view the handle of the device is also represented as broken away. Fig. 4 is a vertical section taken longitudinally through the inner extremity of the handle and the contiguous parts, illustrating the manner of removably attaching the handle. Fig. 5 is a vertical section taken substantially upon the line 5 5 of Fig. 1. Fig. 6 is a vertical section taken substantially through the line 6 6 of Fig. 2, illustrating a device which I use for maintaining the tubs in position in attaching the agitating mechanism; and Fig. 7 is a vertical section taken substantially upon the line 7 7 of Fig. 1.

To refer more particularly to the parts, 1 and 2 represent a pair of tubs, which may be of any general form desired. They are preferably of substantially circular shape and formed, however, on their adjacent sides with flat faces 3, which are placed in abutment, as indicated most clearly in Fig. 1. To the upper edges of these abutting-faces 3 I attach an agitating mechanism 4. This mechanism comprises a horizontal frame 5, which projects laterally in both directions from the faces 3, so as to facilitate the mounting of rotatable spiders 6, the said spiders having attached thereto downwardly-projecting pins 7, which are disposed at substantially the central points of the tubs, as shown. These spiders 6 are integral with pinions 8, which are disposed above the frame 5, and these pinions are adapted to be rotated by means of a double segment 9, having a handle 10 for actuating the same.

On its central line and at one side the frame 5 is provided with a recess or throat 11, in which throat a clamp 12 is pivotally mounted upon horizontal pins 13. The construction of this clamp is most clearly shown in Fig. 5. It comprises a pair of oppositely-disposed arms 14, in one of which a clamping-screw 15 is mounted, the same being provided with a swivel-head 16, adapted to clamp the side faces 3 between the arms 14, as will be readily understood. The frame 5 rests upon the upper edge of the faces 3 and is attached thereto near the opposite side of the tubs. For this purpose upon the under side of the frame at this point a second clamp 17 is provided, the construction of which is most clearly shown in Fig. 7. It does not combine a pivotal connection like the clamp shown in Fig. 5, but simply presents two opposite arms 18, one of which carries a clamping-screw 19 for attaching the same. It should appear that the arms 18 are integral with the frame 5, from which arrangement it follows that when the clamps are attached in position the agitating mechanism will be securely mounted ready for use.

In order to facilitate the proper positioning of the tubs 1 and 2 before attaching the agitating mechanism, I provide a small saddle-clip 20, which is most clearly shown in Fig. 6. This saddle-clip is adapted to be applied to the upper edges of the abutting faces 3, as indicated, so as to maintain the same in abutment while the clamps 12 and 17 are being applied in the manner described. This saddle-clip 20 is preferably attached by means of a suitable cord 21 to a handle 22 of one of the tubs.

The construction described for the agitating mechanism and the means for attaching the same enable this mechanism to be thrown back into the position in which it is represented in Fig. 3 in order to enable the attachment of a wringer 23 at the upper edges of the faces 3. In order to swing the agitating mechanism back in the manner illustrated, it is of course necessary to detach it from the tubs at the clamp 17. When it is desired to remove the agitating mechanism, it is only necessary to detach the same at both clamps, whereupon it may be readily carried from place to place, and while the agitating mechanism may be used in connection with tubs of the general type described evidently it may be attached and used in connection with tubs of many different constructions.

The arrangement for attaching the handle 10 to the segment 9 is such as to facilitate its attachment and detachment, conducing toward the portability of the machine. For this purpose the central bolt 24, which attaches the segment 9, extends upwardly above the same, as indicated most clearly in Fig. 4, and at a suitable point the upper face of the segment is provided with a lug or spur 25. The inner extremity of the handle 10 is provided with a throat or recess 26, which may be thrust around the bolt 24 and under the nut and washer 27, carried thereby. At a suitable point the under face of the handle 10 is provided with a recess 28, which receives the aforesaid spur 25, so that when the handle is applied in the manner indicated in Fig. 4 it is rigidly attached to the segment. However, from the construction described it may be readily removed by loosening the nut and moving the outer end of the handle upwardly, so as to disengage the spur 25, whereupon the handle may be drawn back, so as to disengage it from the bolt 24.

The washing-machine described is evidently very simple in construction and may be readily attached in position and readily detached. The simplicity of the means to this end conduces toward the portability of the device, as also does the construction of the handle, which may be readily detached in the manner described.

Having thus described my invention, I claim as new and desire to secure by Letters Patent—

1. A washing-machine, comprising in combination a pair of tubs presenting abutting substantially flat faces, agitating mechanism including a frame projecting over said tubs, a clamp attached to the upper edges of said flat faces, and a hinge connection between said clamp and said frame.

2. A washing-machine, comprising in combination tubs, a frame thereabove, spiders supported on said frame, a segment adapted to actuate said spiders, a removable handle for said segment, pins carried by said spiders, and a clamp having a pivotal connection with said frame and adapted to attach to the edge of a tub.

3. In a washing-machine, agitating mechanism comprising a frame, clamps at the opposite sides of said frame, a hinge connection at one of said clamps, spiders carrying pins and supported from said frame, a segment adapted to actuate said spiders, and a handle removably attached to said segment.

4. In a washing-machine in combination, a pair of tubs presenting substantially flat abutting faces, a removable saddle-clip adapted to seat upon the upper edges of said faces to position the same, and agitating mechanism removably attached to the upper edges of said faces.

5. In a washing-machine in combination, a frame, spiders supported thereby, pinions rigid with said spiders, a segment between said pinions and meshing therewith, a central bolt projecting upwardly from said segment, said segment having a spur projecting upwardly therefrom, and a handle having a throat opening to the edge at the inner extremity thereof into which said bolt may slide, said handle further having a recess on the under side thereof receiving said spur.

In testimony whereof I have signed my name to this specification in the presence of two subscribing witnesses.

HARRY P. PFLUM.

Witnesses:
 WASHINGTON SMITH,
 HARRY E. FRENCH.